United States Patent
Cao et al.

(10) Patent No.: US 9,760,203 B2
(45) Date of Patent: Sep. 12, 2017

(54) SENSING CIRCUIT AND CAPACITIVE TOUCH PANEL HAVING THE SENSING CIRCUIT

(71) Applicants: SHENZHEN CHINA STAR OPTOELECTRONICS TECHNOLOGY CO., LTD., Shenzhen, Guangdong (CN); WUHAN CHINA STAR OPTOELECTRONICS TECHNOLOGY CO., LTD, Wuhan, Hubei (CN)

(72) Inventors: Chang Cao, Guangdong (CN); Qingcheng Zuo, Guangdong (CN); Gonghua Zou, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 147 days.

(21) Appl. No.: 14/646,831

(22) PCT Filed: Apr. 14, 2015

(86) PCT No.: PCT/CN2015/076526
§ 371 (c)(1),
(2) Date: May 22, 2015

(87) PCT Pub. No.: WO2016/155036
PCT Pub. Date: Oct. 6, 2016

(65) Prior Publication Data
US 2017/0045980 A1    Feb. 16, 2017

(30) Foreign Application Priority Data

Mar. 27, 2015   (CN) .......................... 2015 1 0142277

(51) Int. Cl.
*G06F 3/041*  (2006.01)
*G06F 3/044*  (2006.01)

(52) U.S. Cl.
CPC ............ *G06F 3/0416* (2013.01); *G06F 3/044* (2013.01); *G06F 3/0412* (2013.01)

(58) Field of Classification Search
CPC ....... G06F 3/0416; G06F 3/0412; G06F 3/044
See application file for complete search history.

(56) References Cited

U.S. PATENT DOCUMENTS 7,884,662 B1 *  2/2011  Chuang ................. G06F 3/0416
                                                          327/336

* cited by examiner

*Primary Examiner* — Charles Hicks
(74) *Attorney, Agent, or Firm* — Andrew C. Cheng

(57) ABSTRACT

Disclosed are a sensing circuit and a capacitive touch panel having the sensing circuit. The capacitive touch panel has a glass substrate, first lead wires, second lead wires, third lead wires, signal input channels and signal output channels; amounts of the second, third lead wires are N, and any two of the first, the second and the third lead wires are isolated; each signal input channel is coupled to the first lead wire corresponding thereto; each third lead wire signal output channel of the signal output channels is coupled to the N/2 third lead wires, and an amount of the second lead wire signal output channels is N/2, and each second lead wire signal output channel of the signal output channels is coupled to two second lead wires. The amount of the IC channels is decreased to save the touch panel material cost with the present invention.

16 Claims, 4 Drawing Sheets

SENSING CIRCUIT AND CAPACITIVE TOUCH PANEL HAVING THE SENSING CIRCUIT

CROSS REFERENCE

This application claims the priority of Chinese Patent Application No. 201510142277.2, entitled "Sensing circuit and capacitive touch panel having the sensing circuit", filed on Mar. 27, 2015, the disclosure of which is incorporated herein by reference in its entirety.

FIELD OF THE INVENTION

The present invention relates to a touch panel technology field, and more particularly to a sensing circuit and a capacitive touch panel having the sensing circuit.

BACKGROUND OF THE INVENTION

With the development of science and technology, the smart terminals (the electronic devices such as cellular phones, tablets) are rapidly occupying kinds of respective fields of life. For the smart terminals, the touch panel is one of the indispensible function modules thereof. Now, the touch panels of the smart terminals become larger and larger, the display effect has been optimized in certain better degree.

As the screen of the touch panels become larger and for assuring the function of the touch panel, the required amount of the signal sensing IC (Integrated circuit) channels is increasing. As shown in FIG. 1, FIG. 1 is a structural diagram of a capacitive touch panel according to prior art. The capacitive touch panel comprises a touch panel sensing circuit 10. TX1-TX4 are signals accepted from the four input channels 121-124. RX1-RX8 are signals outputted from the eight output channels 111-118 and 160 is a glass substrate. However, as the touch panel becomes larger, the amounts of the input channels and the output channels have to be increased for assuring that every area of the touch panel can sense the touch operation. Accordingly, the material cost and production cost are enormously increased.

SUMMARY OF THE INVENTION

The technical issue that the embodiment of the present invention solves is to provide a sensing circuit and a capacitive touch panel having the sensing circuit to decrease the amount of the IC channels and save the material cost of the touch panel.

In one aspect, the embodiment of the present invention provides a sensing circuit, and the sensing circuit comprises: first lead wires, second lead wires and third lead wires, signal input channels and signal output channels, wherein,
- an amount of the second lead wires is N, and every two adjacent second lead wires are mutually parallel, and the second lead wires are isolated from and intersect with the first lead wires;
- an amount of the third lead wires is N, and the third lead wires are respectively isolated from the second lead wires and the first lead wires, and intersect with the first lead wires;
- each signal input channel is coupled to the first lead wire corresponding thereto;
- the signal output channels comprise second lead wire signal output channels and two third lead wire signal output channels, wherein each third lead wire signal output channel is coupled to the N/2 third lead wires, and each third lead wire is only coupled to one third lead wire signal output channels, and an amount of the second lead wire signal output channels is N/2, and each second lead wire signal output channel is coupled to two second lead wires, and each second lead wire is only coupled to one second lead wire signal output channel.

In the first possible embodiment in one aspect, an amount of the first lead wires is multiple, and every two adjacent first lead wires are parallel with each other, and an amount of the signal input channels is multiple, and every two adjacent signal input channels are parallel with each other, and the first lead wires and the signal input channels are correspondingly coupled one to one.

In the second possible embodiment in one aspect, the first lead wires and second lead wires are mutually intersecting and perpendicular.

With conjunction of the one aspect and the second possible embodiment in one aspect, in the third possible embodiment in one aspect, the first lead wires and second lead wires are mutually intersecting and perpendicular.

In the fourth possible embodiment in one aspect, the third lead wires are parallel with the second lead wires, and multiple third lead wires are divided into two parts, and each part comprises N/2 third lead wires, and the N/2 third lead wires of each part are coupled to the same third lead wire signal output channel.

With conjunction of the one aspect and the second possible embodiment in one aspect, in the fifth possible embodiment in one aspect, the third lead wires are parallel with the second lead wires, and multiple third lead wires are divided into two parts, and each part comprises N/2 third lead wires, and the N/2 third lead wires of each part are coupled to the same third lead wire signal output channel.

In the sixth possible embodiment in one aspect, one or more of the first lead wires, the second lead wires and the third lead wires are lead wires formed by regular pattern electrical material connected in series.

With conjunction of the one aspect and the second possible embodiment in one aspect, in the seventh possible embodiment in one aspect, one or more of the first lead wires, the second lead wires and the third lead wires are lead wires formed by regular pattern electrical material connected in series.

In another aspect, the embodiment of the present invention provides a capacitive touch panel, and the capacitive touch panel comprises: a glass substrate, first lead wires, second lead wires, third lead wires, signal input channels and signal output channels, wherein,
- the first lead wires are arranged on the glass substrate;
- the second lead wires are arranged on the glass substrate, and an amount of the second lead wires is N, and every two adjacent second lead wires are mutually parallel, and the second lead wires are isolated from and intersect with the first lead wires;
- the third lead wires are arranged on the glass substrate, and an amount of the third lead wires is N, and the third lead wires are respectively isolated from the second lead wires and the first lead wires, and intersect with the first lead wires;
- each signal input channel is coupled to the first lead wire corresponding thereto;
- the signal output channels comprise second lead wire signal output channels and two third lead wire signal output channels, wherein each third lead wire signal output channel is coupled to the N/2 third lead wires, and each third lead wire is only coupled to one third lead wire signal output channels, and an amount of the second lead wire signal output channels is N/2, and each second lead wire signal output channel is coupled to two second lead wires, and each second lead wire is coupled to one second lead wire signal output channel.

In the first possible embodiment in another aspect, an amount of the first lead wires is multiple, and every two adjacent first lead wires are parallel with each other, and an amount of the signal input channels is multiple, and every two adjacent signal input channels are parallel with each other, and the first lead wires and the signal input channels are correspondingly coupled one to one.

In the second possible embodiment in another aspect, the first lead wires and second lead wires are mutually intersecting and perpendicular.

With conjunction of the another aspect and the second possible embodiment in another aspect, in the third possible embodiment in another aspect, the first lead wires and second lead wires are mutually intersecting and perpendicular.

In the fourth possible embodiment in another aspect, the third lead wires are parallel with the second lead wires, and the glass substrate comprises two parts, and each part is arranged with N/2 third lead wires, and the N/2 third lead wires of each part are coupled to the same third lead wire signal output channel.

With conjunction of the another aspect and the second possible embodiment in another aspect, in the fifth possible embodiment in another aspect, the third lead wires are parallel with the second lead wires, and the glass substrate comprises two parts, and each part is arranged with N/2 third lead wires, and the N/2 third lead wires of each part are coupled to the same third lead wire signal output channel.

In the sixth possible embodiment in another aspect, one or more of the first lead wires, the second lead wires and the third lead wires are lead wires formed by regular pattern electrical material connected in series.

With conjunction of the another aspect and the second possible embodiment in another aspect, in the seventh possible embodiment in another aspect, one or more of the first lead wires, the second lead wires and the third lead wires are lead wires formed by regular pattern electrical material connected in series.

By implementing the embodiments of the present invention, the signal output channels are divided into at least two kinds, one kind is employed to detect whether the changing signal comes from the left part or the right part of the touch panel (which can be divided in more parts), the other kind is employed to determine the specific position of the changing signal in the left part or the right part. In such way, the amount of the signal output channels can be halved to tremendously save the material cost.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are merely part of embodiments of the present invention, but not all embodiments. Based on the embodiments of the present invention, all other embodiments to those of ordinary skill in the premise of no creative efforts obtained, should be considered within the scope of protection of the present invention.

Besides, the following descriptions for the respective embodiments are specific embodiments capable of being implemented for illustrations of the present invention with referring to appended figures. For example, the terms of up, down, front, rear, left, right, interior, exterior, side, etcetera are merely directions of referring to appended figures. Therefore, the wordings of directions are employed for explaining and understanding the present invention but not limitations thereto.

In the description of the invention, which needs explanation is that the term "installation", "connected", "connection" should be broadly understood unless those are clearly defined and limited, otherwise, For example, those can be a fixed connection, a detachable connection, or an integral connection; those can be a mechanical connection, or an electrical connection; those can be a direct connection, or an indirect connection with an intermediary, which may be an internal connection of two elements. To those of ordinary skill in the art, the specific meaning of the above terminology in the present invention can be understood in the specific circumstances.

Specifically, the terminology in the embodiments of the present invention are Some features and advantages of the invention are merely for describing the purpose of the certain embodiment, but not to limit the invention. Examples and the appended claims be implemented in the present invention requires the use of the singular form of the book "an", "the" and "the" are intended to include most forms unless the context clearly dictates otherwise. It should also be understood. Besides, the terminologies "first", "second", "third" and "fourth" in the specification, claims and aforesaid figures of the present invention are used for distinguishing different objects but not for describing the specific sequence. Furthermore, the terms "including" and "having" and their any deformations are intended to cover non-exclusive inclusion. An objective of the present invention is a capacitive touch panel. Those of ordinary skill in the art must know that the fundamental structure comprises a liquid crystal display layer, a glass substrate, a transparent electrode layer, an adhering layer and a protective shield.

Figure 1:
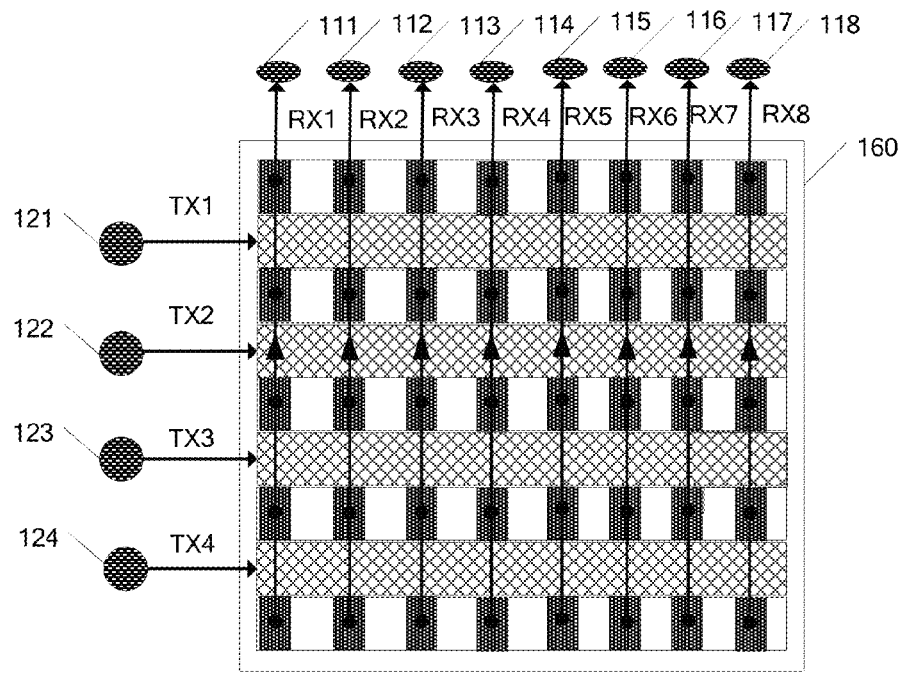
FIG. 1 is a structural diagram of a capacitive touch panel according to prior art.
Figure 2:
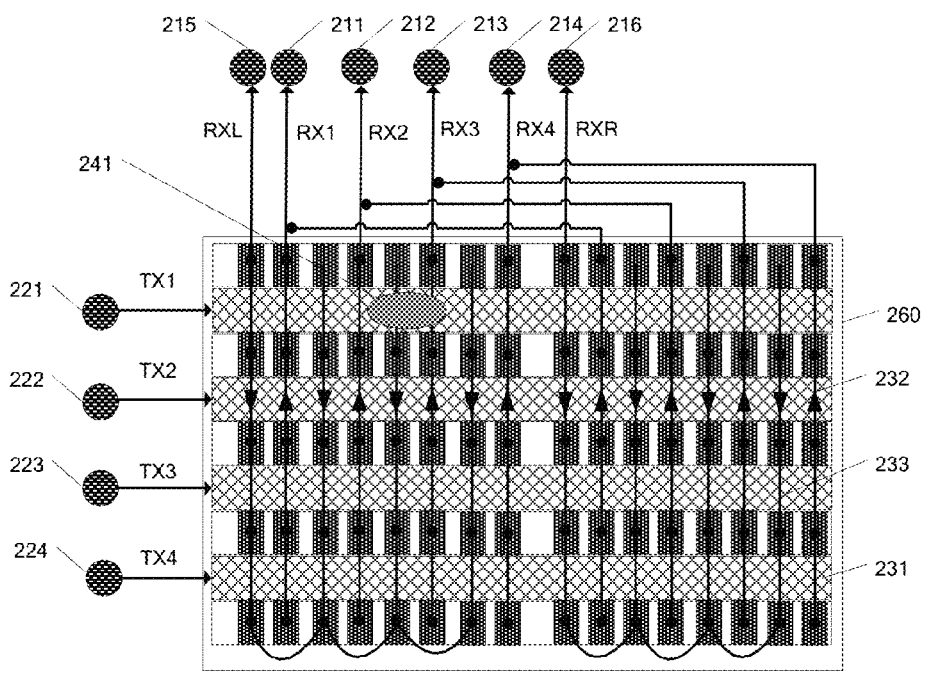
FIG. 2 is a structural diagram of a capacitive touch panel provided by the embodiment of the present invention.

Please refer to FIG. 2. FIG. 2 is a structural diagram of a capacitive touch panel 20 provided by the embodiment of the present invention. The capacitive touch panel 20 comprises a glass substrate 260 and a sensing circuit (not shown). The sensing circuit comprises first lead wires 231, second lead wires 232, third lead wires 233, signal input channels 221, 222, 223, 224 and signal output channels 211, 212, 213, 214, 215, 216. Moreover, the first lead wires 231, the second lead wires 232 and the third lead wires 233 are arranged on the glass substrate 260. The following is the detail description for respective modules. It is understandable that in other embodiments of the present invention, the amounts of the signal input channels, the signal output channels and lead wires are not limited to the number above. Other amount can be set according or practical demands.

The first lead wires 231 are arranged on the glass substrate 260.

Specifically, the first lead wires 231 are manufactured with conductive material, which specifically can be metal, such as Ag, Al and conductive polymer complex but not limited thereto. For assuring the transmission rate of the screen light, the conductive material possesses light transmittance. As an illustration, Al can be manufactured as aluminum sheets or aluminum foils with smaller thicknesses for transmitting the light. Besides, the first lead wires 231 are arranged on the glass substrate 260 can be coated by an electroplating process. Furthermore, the amount of the first lead wires 231 is not specifically limited. As the amount of the first lead wires 231 is multiple, two adjacent first lead wires 231 can be mutually parallel, and the distance between the two adjacent first lead wires 231 can be a predetermined fixed value or in a predetermined value range. That is to say, the multiple first lead wires 231 are evenly arranged on the glass substrate 260. In FIG. 2, for convenience, only one first lead wire 231 is indicated. Obviously, the delineations have the same section of the indicated first lead wire 231 are first lead wires. The function of the glass substrate 260 is intended to be the support of respective lead wires but not limited thereto. Functionally, the glass substrate 260 can be the carrier of the lead wires and possesses light transmittance for its performance. No restriction to the material used for the glass substrate 260 is claimed herewith.

The second lead wires 232 are arranged on the glass substrate 260, and an amount of the second lead wires 232 is N, wherein N is an even number larger than 2. Two adjacent second lead wires 232 are mutually parallel. Besides, the second lead wires 232 are isolated from and intersect with the first lead wires 231.

Specifically, for being distinguished from the third lead wires 233, the second lead wires 232 are marked with upward arrows ▲. It is understandable that theses arrows are merely intended to distinguish the second lead wires and the third lead wires as explaining the solution of the present invention. In practical products, no arrows exist. The second lead wires 232 are manufactured with conductive material, which can be metal, such as Ag, Al and conductive polymer complex but not limited thereto. For assuring the transmission rate of the screen light, the conductive material possesses light transmittance. As an illustration, the second lead wires 232 made of Al can be manufactured as aluminum sheets or aluminum foils with smaller thicknesses for transmitting the light. Besides, the second lead wires 232 are arranged on the glass substrate 260 can be coated by an electroplating process.

Furthermore, the amount of the second lead wires 232 is N, wherein N is an even number larger than 2. Any two second lead wires 232 in the N second lead wires 232 are mutually parallel. The distance between any two adjacent second lead wires 232 can be a predetermined fixed value or in a predetermined value range. That is to say, the N second lead wires 232 are evenly arranged on the glass substrate. In FIG. 2, for convenience, only one second lead wire 232 is indicated. Obviously, the delineations have the same section of the indicated second lead wires 232 are second lead wires.

Specifically, although the second lead wires 232 and the first lead wires 231 are both on the glass substrate 260 and mutually intersect with each other, the second lead wires 232 and the first lead wires 231 are isolated. In specific operation, corresponding bridge circuits can be set at the intersecting positions of the first lead wires 231 and the second lead wires 232. Specifically, The second lead wire 232 coupled between two connection points 236 can be supported by the connection points 236 to cross the first lead wire 231 intersecting with for assuring the isolation of the first lead wires 231 and the second lead wires 232 are mutually isolated as they are evenly arranged on the glass substrate 260. In FIG. 2, only one connection point 236 is indicated. It is understandable that the delineations have the same section are connection points, too. Besides, with the existing bridge at the intersecting positions of the second lead wires 232 and the first lead wires 231, one lead wire must appear to be convex. However, the convex degree is smaller, the lead wires appearing to be convex remain to be considered as straight lines and have the straight line property.

The third lead wires 233 are arranged on the glass substrate 260, and the amount of the third lead wires 233 is N, and the third lead wires 233 are respectively isolated from the second lead wires 232 and the first lead wires 231, and intersect with the first lead wires 231.

Specifically, for being distinguished from the second lead wires 232, the third lead wires 233 are marked with downward arrows ▼. It is understandable that the use of the ▼ is merely intended to assist understanding the solution of the present invention and does not mean there are ▼ in the practical products. The third lead wires 233 are manufactured with conductive material, which can be metal, such as Ag, Al and conductive polymer complex but not limited thereto. For assuring the transmission rate of the screen light, the conductive material possesses light transmittance. As an illustration, the third lead wires 233 made of Al can be manufactured as aluminum sheets or aluminum foils with smaller thicknesses for transmitting the light. Besides, the third lead wires 233 are arranged on the glass substrate can be coated by an electroplating process.

Furthermore, an amount of the third lead wires 233 is N, and more precisely, wires are distributed on the entire glass substrate 260. Two adjacent third lead wires 233 can be mutually parallel and the distance between the two adjacent third lead wires 233 can be a predetermined fixed value or in a predetermined value range. That is to say, the multiple third lead wires 233 are evenly arranged on the glass substrate 260. In FIG. 2, for convenience, only one third lead wire 233 is indicated. Obviously, the lines have the same arrow direction as the indicated third lead wire 233 are third lead wires.

The function of the glass substrate 260 is intended to be the support of respective lead wires but not limited thereto. Functionally, the glass substrate 260 can be the carrier of the lead wires and possesses light transmittance for its performance. No restriction to the material used for the glass substrate 260 is claimed herewith.

The signal input channels 221, 222, 223, 224 are respectively coupled to the first lead wire 231 corresponding thereto.

Specifically, the signal input channel 224 is illustrated. The signal input channel 224 is employed to transmit a pulse signal TX4 to the first lead wire 231 coupled therewith. Specifically, the pulse signal TX4 can be a square wave signal. Specifically, in FIG. 2, all of 221 to 224 are signal input channels. Each signal input channel is coupled to a first lead wire 231 corresponding thereto.

The signal output channels comprises second lead wire signal output channels 211, 212, 213, 214, and third lead wire signal output channels 215, 216. Each third lead wire signal output channel is coupled to the N/2 third lead wires 233. Each third lead wire is coupled to one third lead wire signal output channel. An amount of the second lead wire signal output channels is N/2, and each second lead wire signal output channel is coupled to two second lead wires 232, and each second lead wire 232 is only coupled to one second lead wire signal output channel.

What is necessary for comprehension is, all above is described under circumstance that N is an even number. In practical application, N also can be an odd number. As N is an odd number, in the third lead wire signal output channels in the claims and the specification, one third lead wire signal output channel is coupled to (N+1)/2 third lead wires 233, and the other third lead wire signal output channel is coupled to (N−1)/2 third lead wires 233. Meanwhile, the amount of the lead wire signal output channel is (N+1)/2. It is understandable that the sensing circuit design as N is an odd number is similar as the sensing circuit design as N is an even number in the present application. As derived from the capacitive touch panel shown in FIG. 2, the embodiment of the present invention only disclose the condition of even N in detail. On the basis of the aforesaid embodiments, other embodiments based on that N is an odd number, obtained by those of ordinary skill in this field should be considered within the scope of protection of the present invention.

Specifically, the signal output channels can comprise second lead wire signal output channels 211, 212, 213, 214, and third lead wire signal output channels 215, 216. The amount of the second lead wire signal output channels is related with the amount of the third lead wire signal output channels. With two third lead wire signal output channels, the amount of the second lead wire signal output channels will be a number of equally dividing the amount of the second lead wires with two, which is N/2 specifically. The second lead wire signal output channels are coupled to the second lead wires 232. Specifically, each second lead wire signal output channel is coupled to two second lead wires 232, and each second lead wire 232 is only coupled to one second lead wire signal output channel. Correspondingly, the third lead wire signal output channels are coupled to the third lead wires 233. Specifically, each third lead wire signal output channel is coupled to two third lead wires 233, and each third lead wires 233 is only coupled to one third lead wire signal output channel.

Figure 3:
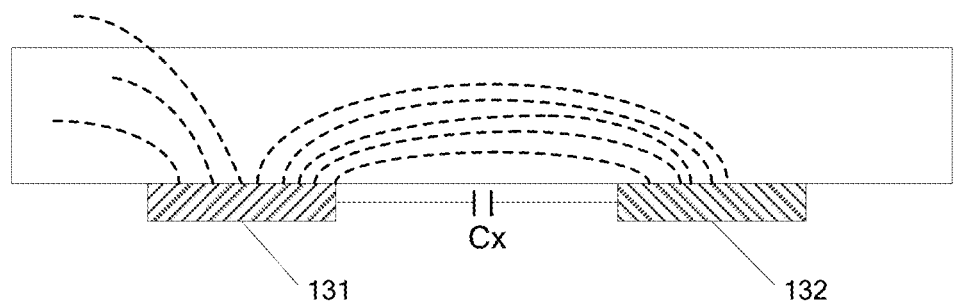
FIG. 3 is an application scenario diagram of the capacitive touch panel provided by the embodiment of the present invention.
Figure 4:
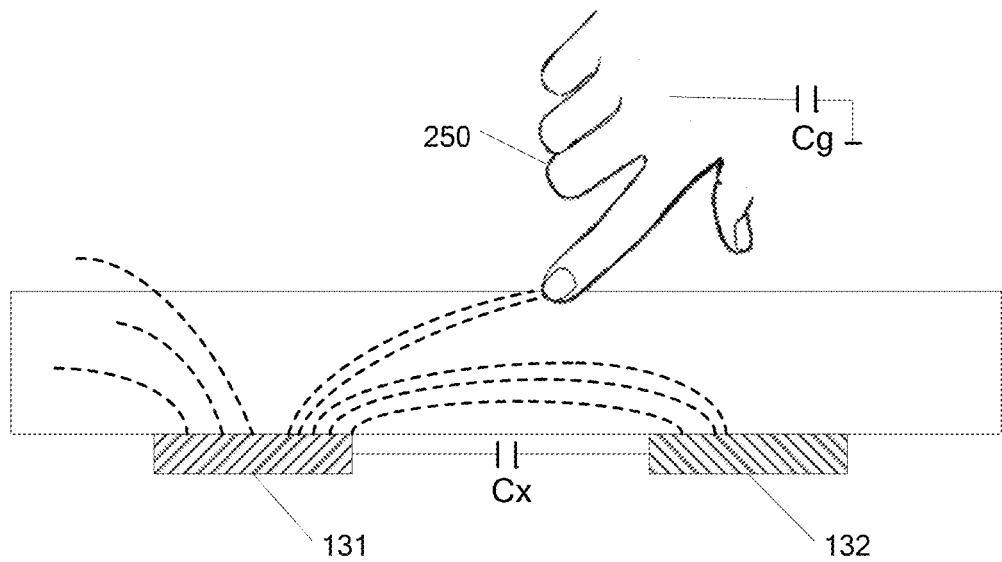
FIG. 4 is an another application scenario diagram of the capacitive touch panel provided by the embodiment of the present invention.
Figure 5:
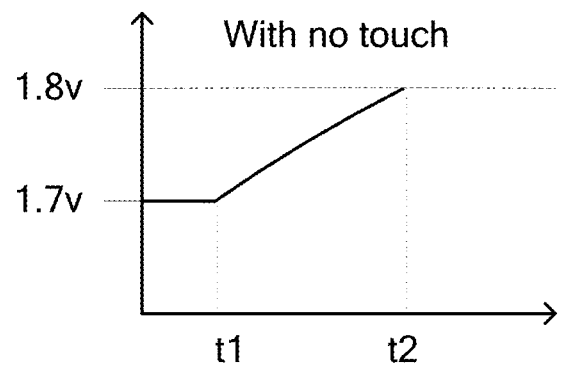
FIG. 5 is a diagram of capacity charge process before touching according to the embodiment of the present invention.
Figure 6:
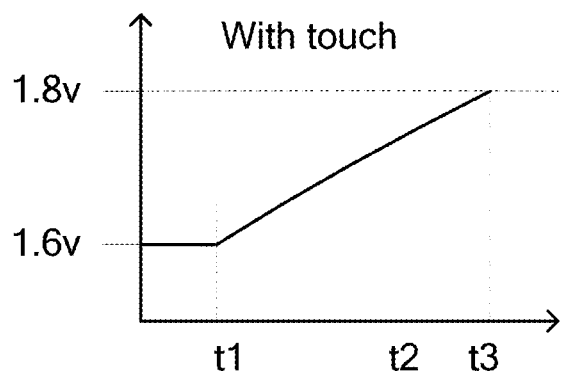
FIG. 6 is a diagram of capacity charge process as touching according to the embodiment of the present invention.

Above is the description to the structure of one kind of capacitive touch panel. For conveniently understanding the skill solution improvement of the present invention, the application embodiment based on the aforesaid structure is provided. Specifically, the application embodiment is merely one embodiment for supporting the optional solution of the present invention but not to limit the protected scope of the invention.

step 1, the terminal with the touch panel inputs the pulse signal, which more precisely is the square wave signal, to the first lead wire 231 electrically coupled to the signal input channel via the signal input channel. As there are multiple first lead wires 231, each first lead wire 231 corresponds to one signal output channel. As the terminal inputs the square wave signal via the signal input channel, the square wave signal (more precisely, high voltage level signal) is inputted to the respective signal input channels according to the predetermined intervals. Correspondingly, the respective first lead wires receive the square wave signal by turns. Therefore, the terminal can determine which signal input channel is inputted with the pulse signal at an arbitrary moment according to the signal on the first lead wires. Supposing at one moment, the pulse signal TX1 is inputted in the signal input channel 221. Then, the first lead wire 231 coupled to the signal input channel 221 receives the pulse signal TX1. The first lead wire 231 is isolated with and closer to the second lead wire 232, and is isolated with and closer to the third lead wire 233. Thus, a capacitor is formed between the first lead wire 231 and the second lead wire 232 (for convenience, it is named with a first lead wire capacitor, as the capacitor Cx shown in FIG. 3), and a capacitor is also formed between the first lead wire 231 and the third lead wire 233 (for convenience, it is named with a second lead wire capacitor, similar as Cx shown in FIG. 3). After the first lead wire 231 coupled to the signal input channel 221 receives the pulse signal, it will respectively and equally charge the first lead wire capacitor and the second lead wire capacitor. The charge process is shown in FIG. 5. In FIG. 5, under the condition of stable charge, it only takes t2−t1 to raise the voltage from 1.7 v to 1.8 v.

step 2, as the pulse signal TX1 is inputted in the signal input channel 221, the touch panel accepts the touch from the outside. In general, it is the touch of the finger 250 (as shown in FIG. 4) but not ruling out the touch of any other forms. The touch point shown in FIG. 2 is illustrated, and as the human touch the left point 241 with the finger 250, a capacitor is also formed between the human body and the first lead wire 231 (for convenience, it is named with an equivalent capacitor, as Cg shown in FIG. 4). Thus, it is also required to charge the equivalent capacitor Cg while charging the first lead wire capacitor and the second lead wire capacitor at the same time, which consequently leads to the situation shown in FIG. 6, i.e. the parameter of charging the first lead wire capacitor Cx changes. The start voltage will be 1.6 v and it takes t3−t1 for charging to the full charge stage 1.8 v, and (t3-t1) is larger than (t2-t1). The charge time will increase. Besides, the parameter of charging the second lead wire capacitor changes in a similar manner, too. RXL signal outputted by the third lead wire 233 coupled to the second lead wire capacitor in the third lead wire signal output channel changes, accordingly. Correspondingly, the RX3 signal of the second lead wire signal output channel 213 coupled to the first lead wire capacitor also change.

Specifically, the processor of the terminal will implement the scan to the output signals of the signal output channels 211, 212, 213, 214, 215, 216 in real time to obtain the change situations of the output signals of the second lead wires 232 and the third lead wires 233. The scans to the second lead wires 232 and the third lead wires 233 are independent in time. The scan can be implemented first to the output signal of the second lead wires 232. Or, the scan can be implemented first to the output signal of the third lead wires 233. Preferably, in this embodiment, the scan is implemented first to the output signal of the third lead wires 233, and then to the output signal of the second lead wires 232. In the embodiment, it can be obtained after the scan that the signals of the third lead wire signal output channel 215 and the second lead wire signal output channel 213 are changed.

step 3, referring to FIG. 2, the terminal first records which signal input channel is inputted with a signal at every moment and supposing that the pulse signal is inputted via the signal input channel 221 as sensing the touch. Then, the processor of the terminal scan that the signals of the third lead wire signal output channel 215 and the second lead wire signal output channel 213 are changed. Specifically, first, the touch point can be determined at the right part of the touch panel with the third lead wire signal output channel 215. Then, the touch point can be determined at the position in the left part above the horizontal direction with the second lead wire signal output channel 213. Moreover, the position of the touch point in the vertical direction can be determined in advance with the signal input channel 221. With the aforesaid sensed data, the left point 241 can be determined.

Specifically, in the step 3, the descriptions of "horizontal direction" and "vertical direction" appear. Such descriptions uses FIG. 2 as the reference. In practical application, the way of descriptions are different as the reference object is different. However, it should be within the protected scope of the invention as long as the same principle is used.

Furthermore, the amount of the first lead wires 231 can be multiple, and every two adjacent first lead wires 231 can be parallel with each other, and the amount of the signal input channels is multiple, and every two adjacent signal input channels can be parallel with each other, and the first lead wires 231 and the signal input channels are correspondingly coupled one to one.

Furthermore, the first lead wires 231 and second lead wires 232 are mutually intersecting and perpendicular.

Furthermore, the third lead wires 233 can be parallel with the second lead wires 232, and the sensing circuit comprises two parts, and each part is arranged with N/2 third lead wires 233, and the N/2 third lead wires of each part are coupled to the same third lead wire signal output channel.

Furthermore, the first lead wires 231, the second lead wires 232 and the third lead wires 233 are lead wires formed by regular pattern electrical material connected in series. Specifically, as considering the appearances of the first lead wires 231, the second lead wires 232 and the third lead wires 233, no restriction is claimed here. In claims, the parallel, perpendicular relationships are proposed but these do not mean that the first lead wires 231, the second lead wires 232 or the third lead wires 233 has to be linear. The first lead wires 231, the second lead wires 232 or the third lead wires 233 can be formed with split jointing regular patterns. If the respective extending directions of the wires are the same direction, then, the lead wires formed by split jointing can be considered to have the linear property (such as the parallel, perpendicular relationships) for convenience of description later.

Figure 7:
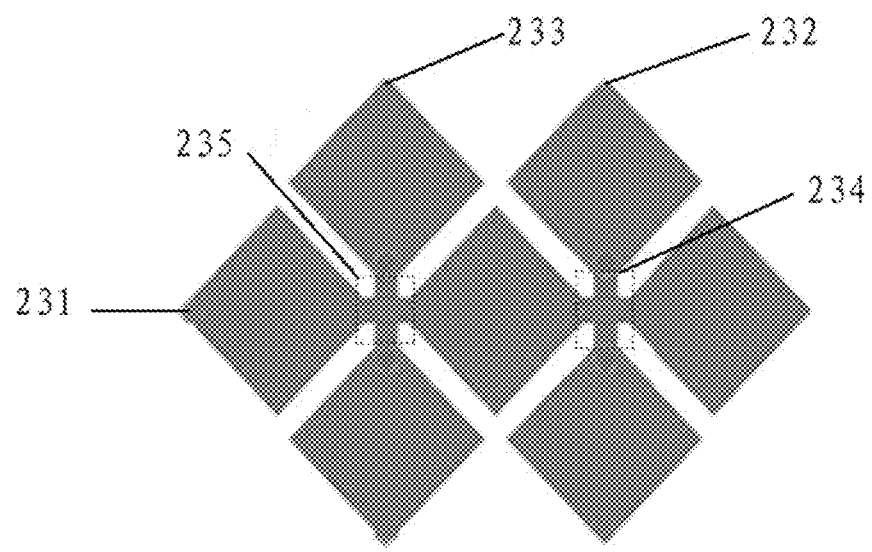
FIG. 7 is a structural diagram of lead wires provided by the embodiment of the present invention.

FIG. 7 can be illustrated. 231, 232 and 233 respectively correspond to the first lead wires, the second lead wires and the third lead wires. Every wire is formed by connecting a plurality of cuboid shaped structure in series. The series and extending direction of every lead wire is on the same straight line. Apparently, the unit constructing the first lead wires, the second lead wires and the third lead wires is not limited to be a cuboid. Other shapes such as triangle, rhombus also can be illustrated. The ways of forming the lead wires can refer to the way of the cuboid. The repeated description is omitted here. Besides, the first lead wires 231 and the second lead wires 232 are intersecting and isolated. Bridge circuits 234 will be formed between the first lead wires 231 and the second lead wires 232. Similarly, the first lead wires 231 and the third lead wires 233 are intersecting and isolated. Bridge circuits 235 will be formed between the first lead wires 231 and the third lead wires 233.

By implementing the embodiments of the present invention, the signal output channels are divided into at least two kinds, one kind is employed to detect whether the changing signal comes from the left part or the right part of the touch panel (which can be divided in more parts), the other kind is employed to determine the specific position of the changing signal in the left part or the right part. In such way, the amount of the signal output channels can be halved to tremendously save the material cost.

In the description of the present specification, the reference terms, "one embodiment", "some embodiments", "an illustrative embodiment", "an example", "a specific example", or "some examples" mean that such description combined with the specific features of the described embodiments or examples, structure, material, or characteristic is included in the utility model of at least one embodiment or example. In the present specification, the terms of the above schematic representation do not certainly refer to the same embodiment or example. Meanwhile, the particular features, structures, materials, or characteristics which are described may be combined in a suitable manner in any one or more embodiments or examples.

Above are embodiments of the present invention, which does not limit the scope of the present invention. Any modifications, equivalent replacements or improvements within the spirit and principles of the embodiment described above should be covered by the protected scope of the invention.

What is claimed is:

1. A sensing circuit, comprising signal input channels and signal output channels, and the sensing circuit further comprises: first lead wires extending in a first direction, second lead wires and third lead wires, wherein,
    an amount of the second lead wires is N, where N is a positive integer greater than 1, and every two adjacent second lead wires are mutually parallel and extending in a second direction, and the second lead wires are isolated from the first lead wires and the second direction intersects with first direction;
    an amount of the third lead wires is N, and the third lead wires extend in a third direction and are respectively isolated from the second lead wires and the first lead wires, and the third direction intersects with the first direction;
    each signal input channel is coupled to the first lead wire corresponding thereto;
    the signal output channels comprise second lead wire signal output channels and two third lead wire signal output channels, wherein each third lead wire signal output channel is coupled to the N/2 third lead wires, and each third lead wire is coupled to one third lead wire signal output channels, and an amount of the second lead wire signal output channels is N/2, and each second lead wire signal output channel is coupled to two second lead wires, and each second lead wire is coupled to one second lead wire signal output channel.

2. The sensing circuit according to claim 1, wherein an amount of the first lead wires is multiple, and every two adjacent first lead wires are parallel with each other, and an amount of the signal input channels is multiple, and every two adjacent signal input channels are parallel with each other, and the first lead wires and the signal input channels are correspondingly coupled one to one.

3. The sensing circuit according to claim 1, wherein the first lead wires and second lead wires are mutually intersecting and perpendicular.

4. The sensing circuit according to claim 2, wherein the first lead wires and second lead wires are mutually intersecting and perpendicular.

5. The sensing circuit according to claim 1, wherein the third lead wires are parallel with the second lead wires, and multiple third lead wires are divided into two parts, and each part comprises N/2 third lead wires, and the N/2 third lead wires of each part are coupled to the same third lead wire signal output channel.

6. The sensing circuit according to claim 2, wherein the third lead wires are parallel with the second lead wires, and multiple third lead wires are divided into two parts, and each part comprises N/2 third lead wires, and the N/2 third lead wires of each part are coupled to the same third lead wire signal output channel.

7. The sensing circuit according to claim 1, wherein one or more of the first lead wires, the second lead wires and the third lead wires are lead wires formed by regular pattern electrical material connected in series.

8. The sensing circuit according to claim 2, wherein one or more of the first lead wires, the second lead wires and the third lead wires are lead wires formed by regular pattern electrical material connected in series.

9. A capacitive touch panel, comprising a glass substrate, signal input channels and signal output channels, and the capacitive touch panel further comprises: first lead wires, second lead wires and third lead wires, wherein,
the first lead wires are arranged on the glass substrate and extend in a first direction;
the second lead wires are arranged on the glass substrate and extend in a second direction, and an amount of the second lead wires is N, where N is a positive integer greater than 1, and every two adjacent second lead wires are mutually parallel, and the second lead wires are isolated from the first lead wires, and the second direction intersects with the first direction;
the third lead wires are arranged on the glass substrate and extend in a third direction, and an amount of the third lead wires is N, and the third lead wires are respectively isolated from the second lead wires and the first lead wires, and the third direction intersects with the first direction;
each signal input channel is coupled to the first lead wire corresponding thereto;
the signal output channels comprise second lead wire signal output channels and two third lead wire signal output channels, wherein each third lead wire signal output channel is coupled to the N/2 third lead wires, and each third lead wire is coupled to one third lead wire signal output channels, and an amount of the second lead wire signal output channels is N/2, and each second lead wire signal output channel is coupled to two second lead wires, and each second lead wire is coupled to one second lead wire signal output channel.

10. The capacitive touch panel according to claim 9, wherein an amount of the first lead wires is multiple, and every two adjacent first lead wires are parallel with each other, and an amount of the signal input channels is multiple, and every two adjacent signal input channels are parallel with each other, and the first lead wires and the signal input channels are correspondingly coupled one to one.

11. The capacitive touch panel according to claim 9, wherein the first lead wires and second lead wires are mutually intersecting and perpendicular.

12. The capacitive touch panel according to claim 10, wherein the first lead wires and second lead wires are mutually intersecting and perpendicular.

13. The capacitive touch panel according to claim 9, wherein the third lead wires are parallel with the second lead wires, and the glass substrate comprises two parts, and each part is arranged with N/2 third lead wires, and the N/2 third lead wires of each part are coupled to the same third lead wire signal output channel.

14. The capacitive touch panel according to claim 10, wherein the third lead wires are parallel with the second lead wires, and the glass substrate comprises two parts, and each part is arranged with N/2 third lead wires, and the N/2 third lead wires of each part are coupled to the same third lead wire signal output channel.

15. The capacitive touch panel according to claim 9, wherein one or more of the first lead wires, the second lead wires and the third lead wires are lead wires formed by regular pattern electrical material connected in series.

16. The capacitive touch panel according to claim 10, wherein one or more of the first lead wires, the second lead wires and the third lead wires are lead wires formed by regular pattern electrical material connected in series.

* * * * *